April 23, 1963　　　　　E. S. RUBIN ETAL　　　　　3,086,357
SUPERSONIC FLOW CONTROL DEVICE
Filed April 30, 1959
2 Sheets-Sheet 1
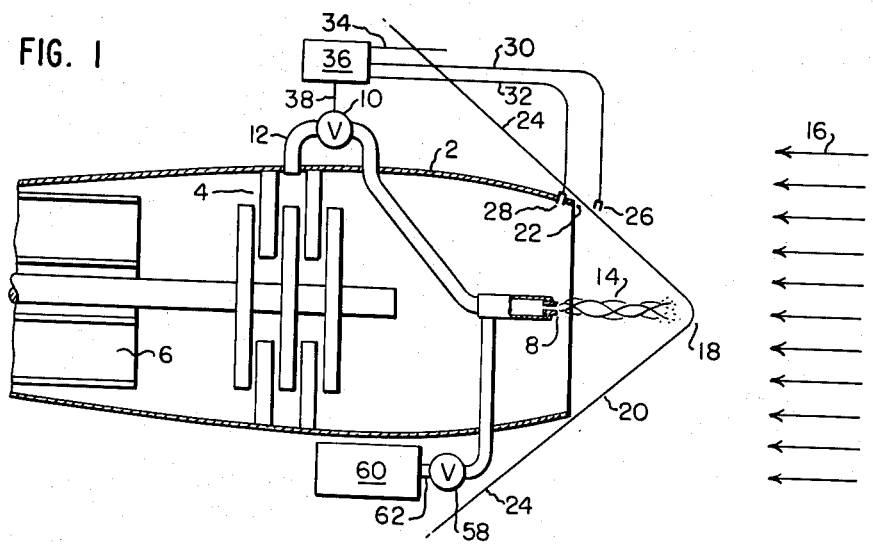
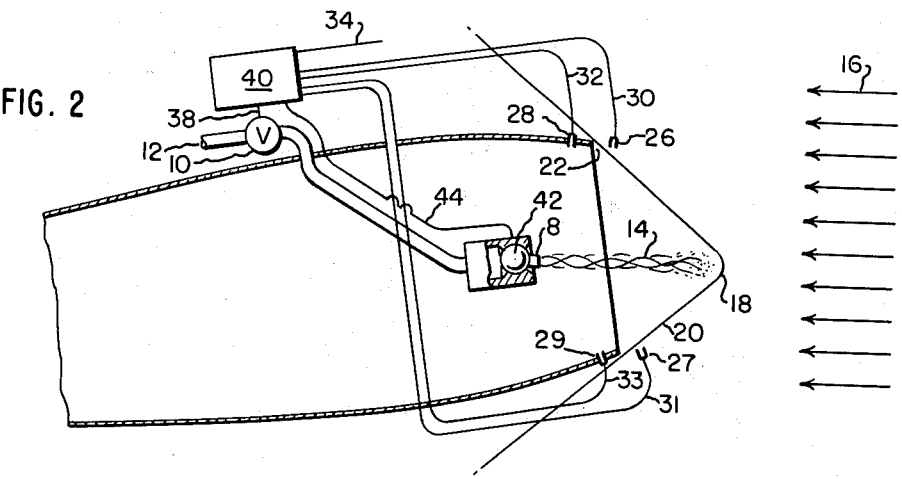
INVENTORS
EUGENE S. RUBIN
DON H. ROSS
BY
ATTORNEY April 23, 1963

E. S. RUBIN ETAL 3,086,357

SUPERSONIC FLOW CONTROL DEVICE

Filed April 30, 1959

INVENTORS
EUGENE S. RUBIN
DON H. ROSS
BY

ATTORNEY

United States Patent Office 3,086,357
Patented Apr. 23, 1963

3,086,357
SUPERSONIC FLOW CONTROL DEVICE
Eugene S. Rubin, Waban, and Don H. Ross, Newton, Mass., assignors, by mesne assignments, to Mithras, Inc., Cambridge, Mass., a corporation of Delaware
Filed Apr. 30, 1959, Ser. No. 810,179
9 Claims. (Cl. 60—35.6)

The present invention relates to supersonic flow devices and more particularly to improvements in diffusing and flow control means operating at supersonic velocities.

With the advent of vehicles that may be propelled at supersonic velocities, and with various types of equipment that handle gas flows at supersonic velocities, it becomes important to control the flow of air or other gas with minimum drag and pressure or mass loss. For example, in the case of the inlet to jet engines, a diffuser is required to convert the kinetic energy of the air flow into static pressure with a minimum of shock or friction loss; that is, with a maximum of total pressure recovery. For air flows at supersonic velocities, a convergent passage is required to decelerate the supersonic flow to subsonic followed by divergent passage to further decelerate the subsonic flow. For a diffuser with fixed geometry, there will be a Mach number at which maximum performance is achieved. Operation at speeds below the design Mach number will involve loss in mass flow and additional drag. Operation above the design Mach number also introduces inefficient inlet conditions. Operation at other than design Mach number may introduce undesirable shock wave conditions, resulting in flame-out or structural damage. Diffusers have customarily been designed with a centrally located innerbody, generally a round body having a cone-pointed nose or tip. While efforts have been made to control diffuser performance under varying conditions by adjustments in cowl configurations and bodily position of the innerbody, the resulting constructions have been complex and the control problem acute, particularly where in most cases the adjustments must be made during operation.

The present invention accordingly has as an object the provision of flow control means for supersonic velocities which is capable of efficient operation over a wide range of flow conditions.

More particularly, it is an object of the invention to provide a supersonic diffuser or other flow control means which may readily be adjusted during operation to provide efficient operation at various Mach numbers and at different angles of attack.

In accordance with these and other objects, the present invention has as a feature the provision of a diffuser or other flow control means wherein a physical or structural innerbody is eliminated and in its place a jet or jets of gas at supersonic velocity are utilized to obtain the desired flow characteristics.

More specifically, the invention concerns the provision of one or more jets of supersonic gas so disposed in relation to the diffuser inlet passage as to permit the controlled inception of the shock wave at the desired position forwardly of the inlet for maximum performance, the jets being controllable to provide optimum correlation of the shock wave with the diffuser inlet at various Mach numbers and angles of attack.

In accordance with the invention there is provided, in a supersonic flow device having an inlet passage, an inlet diffuser for operation at supersonic velocity with respect to the atmosphere surrounding the diffuser. The diffuser includes a passage and a nozzle positioned within the passage. A source of gas is connected with the nozzle. Means are provided for ejecting the gas at supersonic velocity from the nozzle to form a virtual inner body which is spike-like in shape and extends forwardly from within the passage. The interaction of the virtual inner body with the atmosphere initiates an oblique shock wave. Means are provided to control the flow of the gas to the nozzle to produce variations in the length of the virtual inner body, whereby the oblique shock wave is positioned to intercept the periphery of the inlet diffuser.

The novel features which are believed to be characteristic of the invention, both as to its organization and method of operation together with further objects and advantages thereof, will be better understood from the following description considered in connection with the accompanying drawings in which embodiments of the invention are illustrated by way of example. It is to be expressly understood, however, that the drawings are to be used for descriptive purposes only and are not intended as a definition of the limits of the invention.

FIGURE 1 is a diagrammatic view of the forward portion of a jet engine with an inlet diffuser employing a single virtual innerbody.

FIGURE 2 is a diagrammatic view of the forward portion of a jet engine with an inlet diffuser employing a single virtual innerbody operated at an angle of attack.

Figure 3:
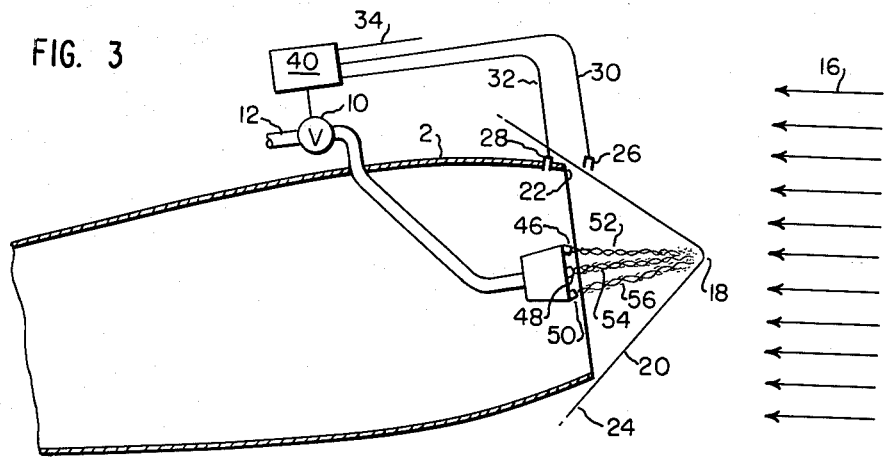
FIGURE 3 is a diagrammatic view of the forward portion of a jet engine with an inlet diffuser employing multiple virtual innerbodies at an angle of attack.

Referring to FIGURE 1, the forward portion of a jet engine 2 embodying the present invention is shown. A conventional compressor 4 and combustion chambers 6 have been provided. However, a totally different system has been provided to replace the conventional centrally located innerbody normally employed. A virtual or aerodynamic innerbody composed solely of gas is caused to initiate a shock wave in advance of the vehicle. This shock wave is initiated in substantially the same position it would have been initiated by a properly positioned conventional innerbody.

A nozzle 8 is centrally located within the inlet. Control means 10 serves to control the flow of gas from compressor 4 through line 12 to nozzle 8. The gas is expelled from nozzle 8 at supersonic velocity to form a gaseous or virtual innerbody 14. This virtual innerbody extends forward into the oncoming supersonic air stream 16 until it terminates at point 18, where shock wave 20 commences. Shock wave 20 intersects the cowl 22 of the inlet and an additional shock wave 24 forms at the cowl. Optimum engine performance with a minimum of drag is obtained when shock wave 20 is so positioned.

Unfortunately, shock wave locations and flow patterns change with vehicle Mach number. For instance if the innerbody in a conventional inlet is properly positioned and then the speed is reduced, the oblique shock wave is outside the cowl lip, resulting in increased drag and loss of mass flow. On the other hand, if speed is increased, the oblique shock wave moves within the cowl lip. The resultant shock conditions within the inlet result in inefficient conditions. As noted earlier, attempts have been made to maintain the position of the oblique shock wave under varying speeds by providing means for translating the innerbody. The engine structure itself limits the corrections which can be obtained and the heating produced in supersonic flight imposes severe materials limitations. In embodiments of the present invention, structural heating of the innerbody with its attendant materials problems has been substantially avoided, since no solid physical innerbody is disposed forwardly to meet the oncoming supersonic stream. While the forward portion of the aerodynamic innerbody does experience heating, no structural problem is introduced, since the air or other gas is continually replaced.

In the present invention, translation of the point of inception of shock wave 20 is accomplished by varying the rate of gas supply to nozzle 8. Increases in the rate of flow produce increases in the length of virtual innerbody 14 until flow rates of somewhat greater than 5 percent of the flow intercepted by the inlet are reached. At this point, the length of the innerbody decreases due to a breakdown of the shock structure which has, for lower flow rates, sustained a relatively narrow virtual innerbody. A very small fraction of the compressor's output is adequate to supply the mass flow required to produce the virtual innerbody. In general, it would normally be on the order of only a few percent of the flow intercepted by the engine inlet. The gas can be taken from the combustion chamber rather than one of the compressor stages if desired, or an independent supply may be provided.

Variations in the back pressure at the nozzles and the Mach number of the nozzles themselves will produce similar variations in the aerodynamic spike. While variable Mach number nozzles could be employed, in applicants' preferred embodiments a fixed Mach number nozzle appropriate for the operational ranges anticipated, normally a Mach number slightly lower than maximum vehicle speed, is employed in order that the control system within the inlet diffuser may be of the utmost simplicity and reliability. Variations in pressure and mass flow, of course, are easily obtained by simple and reliable valve arrangements.

The sensing arrangements can be any of those now used for conventional diffusers, the only difference being that the output merely controls a valve rather than the translation of a physical innerbody. By way of example, in FIGURE 1 pressure taps 26 and 28 have been provided to sense the operating conditions for proper positioning of the shock wave. Tap 26 is located just forward of cowl 22 and tap 28 is located just aft of the cowl. The separation has been exaggerated and shown schematically for clarity in the drawing. Pressures from taps 26 and 28 are fed to valve controller 36 through lines 30 and 32 respectively. Static pressure is fed to controller 36 as a reference through line 34. If the oblique shock is ahead of a tap, its pressure will be greater than the static reference pressure. Therefore, controller 36 controls valve 10 through line 38 to increase the flow and, therefore, the length of the virtual innerbody until tap 28 is at greater than static reference pressure but decreases flow if tap 26 is at greater than static reference pressure. Thus, the oblique shock wave is positioned between taps 26 and 28, that is, at the cowl lip. It will be seen that with an extremely simple system of sensing, consisting of simple gauges, and of control, consisting of a simple valve or valves, optimum diffuser performance can be maintained under a variety of operating speeds. Furthermore, both the control and operative elements are not exposed to the severe heating conditions of a normal innerbody. As noted earlier, it may be desirable to control either the nozzle back pressure, the mass flow or a combination of the two.

Even if operated at design speed, the normal diffuser structure suffers considerable degradation of performance during maneuvers when the vehicle meets the air stream at an angle of attack. On the lee side the oblique shock wave is outside the cowl lip, whereas on the other side the oblique shock wave is well within the cowl lip. The net result is a degradation in performance on one half of the inlet corresponding to that obtained at operation under design speed while on the other half of the inlet it is a degradation of performance corresponding to that which would be obtained under operation above design speed. While it might theoretically be possible to reorient the innerbody angularly to reposition the oblique shock wave to intersect the cowl lip, the formidable practical difficulties of providing an innerbody which is capable of both translation—to reposition the shock wave with changes in speed—and angular movement to reposition the shock wave with changes in angle of attack, have never been solved. Problems of reliability would be likely to arise in any complex structure capable of such adjustment, and, of course, it would be subject to the severe heating experienced by any physical body at supersonic speeds. The virtual innerbody of this invention, however, may be easily offset to correct for changes in angle of attack.

FIGURE 2 shows an inlet diffuser embodying the present invention operating at an angle of attack. The nozzle 8 has been offset through an angle proportional to the angle of attack so that the shock wave 20 continues to intercept cowl lip 22. Simple pressure taps 26, 28 and 27, 29 at the lee and forward sides respectively of the cowl 22 provide the necessary data to control the offset of the nozzle. Controller 40, to which the pressures are fed through lines 30, 32 and 31, 33, and to which static reference pressure is fed through line 34 is analogous to controller 36 of FIGURE 1. Controller 40 operates in a manner identical to that described above for controller 36 in flight at zero angle of attack. At an angle of attack, however, control of the length of the virtual innerbody alone is insufficient to maintain optimum performance. If the virtual innerbody of FIGURE 2 were not offset, the oblique shock would be ahead of taps 26, 28 and behind taps 27, 29. Therefore, the controller 40 sends a control signal to offsetting mechanism 42 through line 44 to cause the nozzle 8 and, therefore, the virtual innerbody 14 to be offset until the pressure at taps 28 and 29, but not taps 26 and 27, is greater than static reference pressure. The oblique shock wave 20 then has the desired positioning as shown. Since the structure supporting the nozzle 8 and offsetting mechanism 42 does not need to be capable of translation, the necessary corrections to reposition shock wave with changes in speed being obtained through variations of the mass flow through nozzle 8, it is relatively simple to provide the necessary structure. Furthermore, since the forward position of the effective structure is merely the virtual innerbody 14 which is continually being replaced, materials problems due to heating are effectively avoided.

If angles of attack can be assumed in more than one plane, a condition possible with missiles but unlikely for normal aircraft, then more than two pairs of taps will be required. Two additional pairs placed at the ends of a line perpendicular to a line joining the first two pairs will be sufficient. The operation of each set of pairs is identical to that described above.

Additional pressure taps may be avoided if other means are provided to obtain the offsetting information. For example, if angle of attack information is available from standard instrumentation in the vehicle, this information may be fed to controller 40 to cause offsetting mechanism 42 to properly offset nozzle 8 for the angle of attack operation.

An alternative arrangement for an inlet diffuser which solves the problems associated with varying angles of attack is shown in FIGURE 3. It will be seen that instead of a single nozzle as provided in the previous embodiments, this diffuser is provided with three nozzles, 46, 48 and 50. These nozzles, spaced 120° apart and oriented at an angle to the axis of the engine provide in effect a composite aerodynamic innerbody, consisting of innerbodies 52, 54 and 56, which is properly oriented for varying angles of attack. Within substantial variations in angle of attack, with the embodiment shown, at least one spike is properly oriented to produce the desired effective configuration and air flow. FIGURE 3 is derived from Schlieren photographs of a body with such a multiple nozzle structure operated at an angle of 10°. It will be seen that the shock wave 20 and air flow are substantially that which would be produced by a single aerodynamic spike properly oriented for this angle of attack and for that matter also equivalent to the results which would be produced by a physical body so oriented. With the multiple nozzle structure of FIGURE 3, it will be seen that no reorientation is necessary, so that neither sensing nor control means need be provided to obtain near optimum performance under varying angles of attack. If still finer control is desired, individual control to the supply for nozzles 46, 48 and 50 may be provided, so that the point at which the virtual innerbodies 52, 54 and 56 merge may be offset in accordance with the angle of attack. However, it has been found that the structure shown in FIGURE 3 provides satisfactory operation for angles of attack within normal vehicle structural capabilities. With respect to correcting for changes in vehicle speed, the situation is identical to that previously discussed for the single nozzle embodiment and similar sensing and control means may be employed.

While three nozzles have been used to illustrate plural innerbody arrangements, a larger number may, of course, be similarly employed. In fact, if all roll angles are likely to be encountered, a four-nozzle configuration is preferable to a three-nozzle configuration. While some improvement is achieved with further increases in the number of nozzles, the improvement would not normally justify the increased equipment.

In all of the above embodiments, fuel may be ejected through the nozzle or nozzles employed to produce virtual innerbodies. In this way, atomization of fuel is provided in the most forward position possible and nearly perfect air-fuel mixing can be achieved before the gas reaches the combustion chamber. For example, in the embodiment of FIGURE 1, valve 58 controls the flow of fuel from tank 60 through line 62 to nozzle 8. Through this ejection of a portion or all of the fuel, the resulting improvement in atomization and mixture produces an increase in the overall efficiency of combustion and minimizes hot spots within the combustion chamber. In a normal engine, hot spots can occur due to local variations in the fuel mixture.

It will be apparent that the embodiments described above are illustrative only and that many variations may be made by those skilled in the aerodynamic arts. For example, though nose diffusers have been discussed, the invention is equally appropriate for side mounted diffusers, though the exact structure would, of course, be modified somewhat.

Thus, through the use of innerbodies with no solid structure in their most forward portion, optimum diffuser performance may be maintained over a wide range of operating conditons. These structures permit the ready solution of both drag and pressure problems associated with variations in speed, and problems associated with angle of attack operation. A tremendous variety of innerbody configurations may be obtained. Both sensing and control elements may be extremely simple and employ only very reliable components, particularly if an embodiment employing no moving parts in the inlet is employed.

The foregoing embodiments have been employed in structures facing into the oncoming supersonic stream. While these represent the most common situation in present-day supersonic vehicles, there are many situations in which a supersonic flow must be controlled at its exit. For example, such problems exist at the exit of a jet engine combustion chamber or a rocket nozzle. In jet engines an innerbody or exit plug is provided to control the flow of exhaust gas so that it expands to optimum Mach number. This exhaust plug, being subjected to the extremely high temperatures and flow rates of combustion, soon loses its desired properties. According to the teachings of the present invention, these exhaust-plug materials problems can be avoided through the use of a virtual plug or innerbody formed by the expansion of gas through a nozzle.

Figure 4:
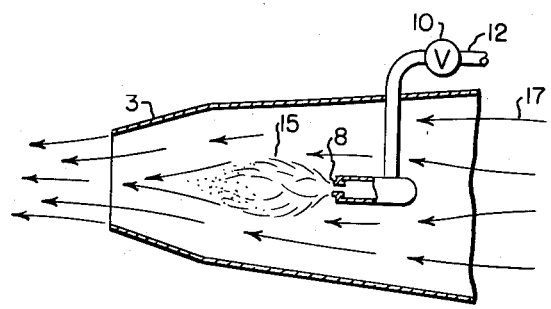
FIGURE 4 is a diagrammatic view of the rear portion of a jet engine employing a virtual exhaust plug.

By way of example, FIGURE 4 illustrates a structure suitable for use at the end of a jet engine combustion chamber. In a manner analogous to that previously described for forward-facing embodiments, gas is supplied through line 12, to nozzle 8, the flow being controlled by valve 10. The supersonic stream of gas being expelled from nozzle 8 forms virtual plug 15. The exiting stream 17 from the combustion chamber is constrained between virtual plug 15 and the engine shell 3. The virtual plug, being formed of gas which is continually replaced, maintains both structural and aerodynamic integrity so that optimum performance can be achieved from the power plant.

As in prior-described embodiments, increases in mass flow through the nozzle increase the length of the virtual plug until the overblown state is reached, when there is a substantial decrease in length accompanied by a substantial increase in breadth of the virtual plug. The virtual plug will normally be operated at or near the overblown condition. With conventional, physical-structure exhaust plugs, the severe temperature problems normally require a constant plug configuration to be used. This configuration is a compromise to obtain satisfactory performance over the range of engine operating conditions. The present invention can also be so employed if the utmost in simplicity is desired. With the present invention, however, variations in the virtual plug can easily be obtained by varying mass flow or pressure. If the exhaust gases are to be controlled over a substantial range of Mach numbers, such variation is particularly desirable and may be accomplished simply by control of the mass flow. In the embodiment of FIGURE 4, for example, valve 10 may be controlled in correspondence with variations in engine operating conditions.

Although a single nozzle has been shown in FIGURE 4, plural nozzles may be used. In fact, an annular virtual innerbody, formed by an annular nozzle or a ring of nozzles, can perform the flow control function of the engine shell 3. If afterburner performance is desired, fuel may be ejected through any or all of the nozzle or nozzles being used for flow control.

While an exhaust plug is not normally subjected to varying angles of attack, it may be desirable to deflect the exhaust flow to, for example, steer a rocket. In such cases, angular off-set of the virtual plug can be provided by means such as those described above with respect to diffuser embodiments, or the annular innerbody, if used, may be expanded or contracted non-uniformly around its circumference.

The flow control means described above in conjunction with oncoming supersonic streams and exciting supersonic streams are illustrative only and do not serve to limit the invention. Those skilled in the art of supersonic flow will recognize that the teachings of the present invention provide supersonic flow control means employing virtual bodies which will enhance performance and minimize structural materials problems in a wide variety of applications.

Having thus described our invention, we claim:

1. In a supersonic flow device having an inlet passage, an inlet diffuser for operation at supersonic velocity with respect to the atmosphere surrounding said diffuser comprising a passage, a nozzle positioned within said passage, a source of gas connected with said nozzle, means for ejecting gas at supersonic velocity from said nozzle to form a virtual innerbody, spike like in shape, extending forwardly from within said passage, the interaction of said virtual innerbody with said atmosphere initiating an oblique shock wave, and means to control the flow of gas to said nozzle to produce variations in the length of said virtual innerbody whereby said oblique shock wave is positioned to intercept the periphery of said inlet diffuser.

2. In a supersonic flow device having an inlet passage, an inlet diffuser for operation at supersonic velocity with respect to the atmosphere surrounding said diffuser comprising a passage, an angularly adjustable nozzle positioned within said passage, a source of gas connected with said nozzle, means for ejecting gas at supersonic velocity from said nozzle to form a virtual innerbody, spike like in shape, extending forwardly from within said passage, the interaction of said virtual innerbody with said atmosphere initiating an oblique shock wave, and means to control the flow of gas to said nozzle and the angle of said nozzle to produce variations in the length of said virtual innerbody and angle of attack whereby said oblique shock wave is positioned to intercept the periphery of said inlet diffuser.

3. In a supersonic flow device having an inlet passage, an inlet diffuser for operation at supersonic velocity with respect to the atmosphere surrounding said diffuser comprising a passage, a nozzle positioned within said passage, a source of gas connected with said nozzle, means for ejecting gas at supersonic velocity from said nozzle to form a virtual innerbody, spike like in shape, extending forwardly from within said passage, the interaction of said virtual innerbody with said atmosphere initiating an oblique shock wave, and means, including a sensing means at the entrance to the inlet passage, to control the flow of gas to said nozzle to produce variations in the length of said virtual innerbody whereby said oblique shock wave is positioned to intercept the periphery of said inlet diffuser.

4. In a supersonic flow device having an inlet passage, an inlet diffuser for operation at supersonic velocity with respect to the atmosphere surrounding said diffuser comprising a passage, a plurality of nozzles positioned within said passage, a source of gas connected with said nozzles, means for ejecting gas at supersonic velocity from said nozzles to form virtual innerbodies, spike like in shape, extending forwardly from within said passage, the interaction of said virtual innerbody with said atmosphere initiating an oblique shock wave, and means to control the flow of gas to said nozzles to produce variations in the length of said virtual innerbodies whereby said oblique shock wave is positioned to intercept the periphery of said inlet diffuser.

5. An inlet diffuser in accordance with claim 1, wherein:
said gas flow control means includes sensing means for producing a differential pressure by comparing exterior and interior pressures relative to an entrance aperture of said inlet passage.

6. An inlet diffuser in accordance with claim 1, wherein:
said gas flow control means includes sensing means for producing a differential pressure by comparing exterior and interior pressures relative to an entrance aperture of said inlet passage, reference static means for producing a reference pressure, and pressure comparator means for producing an error signal in accordance with the diifference between said reference and differential pressures.

7. An inlet diffuser in accordance with claim 1, wherein:
said gas flow control means includes sensing means for producing a differential pressure by comparing exterior and interior pressures relative to an entrance aperture of said inlet passage, reference static means for producing a reference pressure, pressure comparator means for producing an error signal in accordance with the difference between said reference and differential pressures, and flow control valve means for controlling said gas flow in response to said error signal.

8. An inlet diffuser in accordance with claim 2, wherein:
said gas flow and angle control means include sensing means for producing differential pressures by comparing exterior and interior pressures relative to an entrance aperture of said inlet passage, reference static means for producing a reference pressure, and pressure comparator means for producing error signals in accordance with the difference between said reference and differential pressures, and nozzle angle control means for controlling said nozzle angle in response to at least one of said error signals.

9. An inlet diffuser in accordance with claim 2, wherein:
said gas flow and angle control means include sensing means for producing differential pressures by comparing exterior and interior pressures relative to an entrance aperture of said inlet passage, reference static means for producing a reference pressure, and pressure comparator means for producing error signals in accordance with the difference between said reference and differential pressures, flow control valve means for controlling said gas flow in response to at least one of said error signals, and nozzle angle control means for controlling said nozzle angle in response to at least one of said error signals.

References Cited in the file of this patent

UNITED STATES PATENTS

| | | |
|---|---|---|
| 2,638,738 | Salter | May 19, 1953 |
| 2,807,933 | Martin | Oct. 1, 1957 |
| 2,829,490 | Kresse | Apr. 8, 1958 |
| 2,864,236 | Toure et al. | Dec. 16, 1958 |
| 2,906,089 | Kadosch et al. | Sept. 29, 1959 |